(12) United States Patent
Yamanaka et al.

(10) Patent No.: US 9,824,296 B2
(45) Date of Patent: Nov. 21, 2017

(54) EVENT DETECTION APPARATUS AND EVENT DETECTION METHOD

(71) Applicant: CANON KABUSHIKI KAISHA, Tokyo (JP)

(72) Inventors: Masao Yamanaka, Tokyo (JP); Masakazu Matsugu, Yokohama (JP); Yasuo Katano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 13/672,439

(22) Filed: Nov. 8, 2012

(65) Prior Publication Data
US 2013/0121590 A1 May 16, 2013

(30) Foreign Application Priority Data
Nov. 10, 2011 (JP) ................................. 2011-246705

(51) Int. Cl.
*G06K 9/00* (2006.01)
*G06K 9/62* (2006.01)
*H04N 5/14* (2006.01)

(52) U.S. Cl.
CPC ....... *G06K 9/6201* (2013.01); *G06K 9/00751* (2013.01); *G06K 9/00771* (2013.01);
(Continued)

(58) Field of Classification Search
CPC .......... G06K 9/00335; G06K 9/00624; G06K 9/00771; G06T 7/2006; G06T 7/2013;
(Continued)

(56) References Cited

U.S. PATENT DOCUMENTS 5,801,765 A * 9/1998 Gotoh .................... H04N 5/147
348/155
5,835,163 A * 11/1998 Liou ................. G06F 17/30799
348/699
(Continued)

FOREIGN PATENT DOCUMENTS

JP 2006-79272 A 3/2006
JP 2007-328435 A 12/2007
JP 2010-218022 A 9/2010

OTHER PUBLICATIONS

Rómer Rosales "Recognition of Human Action Using Moment-Based Features", Boston University Computer Science Technical Report BU 98-020, Nov. 1998, pp. 1-19.*
(Continued)

*Primary Examiner* — Eric Rush
(74) *Attorney, Agent, or Firm* — Canon USA, Inc. I.P. Division

(57) ABSTRACT

An event detection apparatus includes an input unit configured to input a plurality of time-sequential images, a first extraction unit configured to extract sets of first image samples according to respective different sample scales from a first time range of the plurality of time-sequential images based on a first scale parameter, a second extraction unit configured to extract sets of second image samples according to respective different sample scales from a second time range of the plurality of time-sequential images based on a second scale parameter, a dissimilarity calculation unit configured to calculate a dissimilarity between the first and second image samples based on the sets of the first and second image samples, and a detection unit configured to detect an event from the plurality of time-sequential images based on the dissimilarity.

11 Claims, 18 Drawing Sheets

(52) U.S. Cl.
CPC .......... *G06K 9/6212* (2013.01); *H04N 5/144* (2013.01); *H04N 5/147* (2013.01)

(58) Field of Classification Search
CPC ....... G06T 7/202; G06T 7/204; G06T 7/2046; G06T 7/2053; G06T 7/2073; H04N 5/144; H04N 5/147; G08B 13/18; G08B 13/189; G08B 13/1895; G08B 13/194; G08B 13/196; G08B 13/19602
USPC ....... 382/100, 103, 181, 217–219, 224, 325; 396/153; 348/152–155, 161
See application file for complete search history.

(56) References Cited

U.S. PATENT DOCUMENTS

| | | | | |
|---|---|---|---|---|
| 5,990,980 | A * | 11/1999 | Golin | 348/700 |
| 6,587,637 | B2 * | 7/2003 | Nagasaka | G06K 9/00711 348/552 |
| 7,038,736 | B2 * | 5/2006 | Tojo | G06K 9/00711 348/700 |
| 7,327,885 | B2 * | 2/2008 | Divakaran | G06K 9/00711 382/190 |
| 7,444,018 | B2 * | 10/2008 | Qi et al. | 382/170 |
| 2002/0085740 | A1 * | 7/2002 | Asano | G06K 9/00711 382/107 |
| 2003/0058341 | A1 * | 3/2003 | Brodsky et al. | 382/103 |
| 2005/0117061 | A1 * | 6/2005 | Li et al. | 348/590 |
| 2005/0286774 | A1 * | 12/2005 | Porikli | G06K 9/00335 382/225 |
| 2006/0018516 | A1 * | 1/2006 | Masoud | G06K 9/00342 382/115 |
| 2007/0279490 | A1 * | 12/2007 | Zhou | G06K 9/00771 348/143 |
| 2011/0044499 | A1 * | 2/2011 | Cobb | G06K 9/00771 382/103 |
| 2011/0051992 | A1 * | 3/2011 | Cobb et al. | 382/100 |
| 2011/0128374 | A1 * | 6/2011 | Shellshear | H04N 7/18 348/135 |

OTHER PUBLICATIONS

Supriya Rao and P.S. Sastry, "Abnormal activity detection in video sequences using learnt probability densities", IEEE, Conference on Convergent Technologies for the Asia-Pacific Region, vol. 1, Oct. 2003, pp. 369-372.*

HongJiang Zhang, Atreyi Kankanhalli, and Stephen W. Smoliar, "Automatic partitioning of full-motion video", Multimedia Systems, vol. 1, Issue 1, 1993, pp. 10-28.*

Makoto Yamada, Taiji Suzuki, Takafumi Kanamori, Hirotaka Hachiya and Masashi Sugiyama, "Relative Density-Ratio Estimation for Robust Distribution Comparison", Advances in Neural Information Processing Systems 24, 2011, pp. 1-9.*

Takuya Nanri;"Detection of Abnormal Motion from a Scene Containing Multiple Person's Moves"; Information Processing Society of Japan, Computer Vision and Image Media, vol. 45, No. SIG15, pp. 43 to 50, 2005.

Sugiyama, "New machine learning paradigm based on a probability density ratio", Information Processing Society of Japan, vol. 52, No. 8, pp. 1011, Aug. 2011.

Kobayashi, et al.,"Action and Simultaneous Multiple-Person Identification Using Cubic Higher-Order Local Auto-Correlation", International Conference on Pattern Recognition, 2004.

Dalal, et al., "Histograms of oriented gradients for human detection", Proc. of IEEE Conference on Computer Vision and Pattern Recognition (CVPR), pp. 886-893, 2005.

Lowe, "Distinctive image features from scale-invariant keypoints", Journal of Computer Vision, 60, 2, pp. 91-110, Jan. 5, 2004.

Kanamori, et al., "A least-squares approach to direct importance estimation", Journal of Machine Learning Research, 10:1391-1445, Jul. 2009.

* cited by examiner

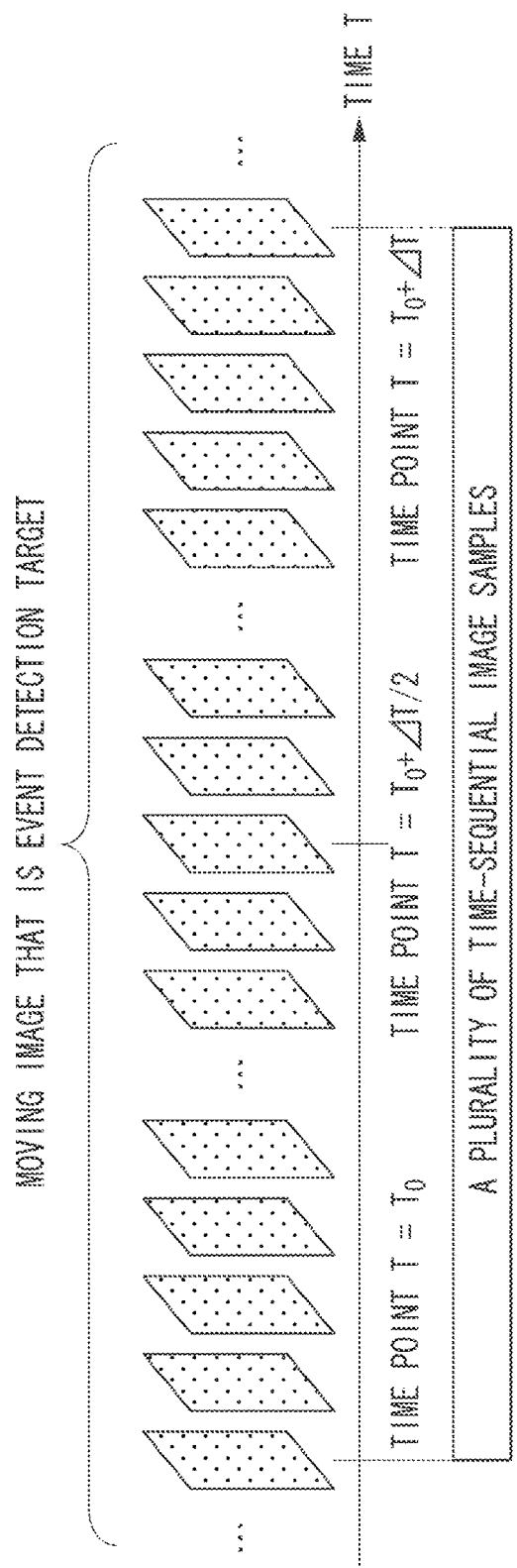

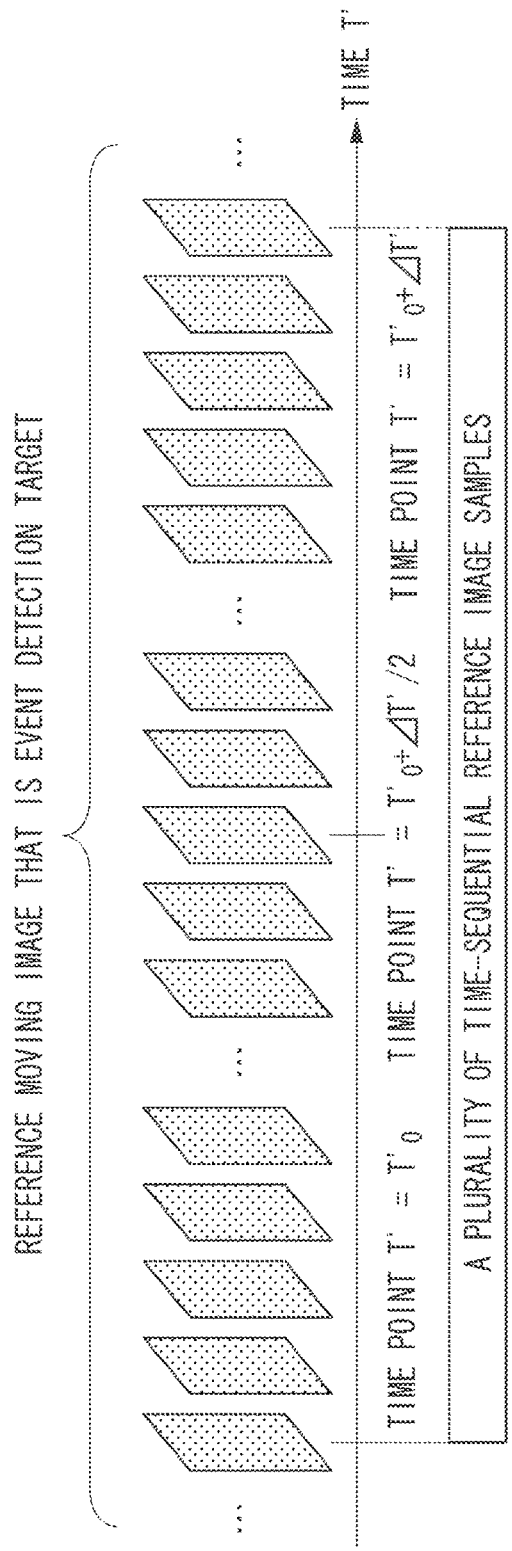

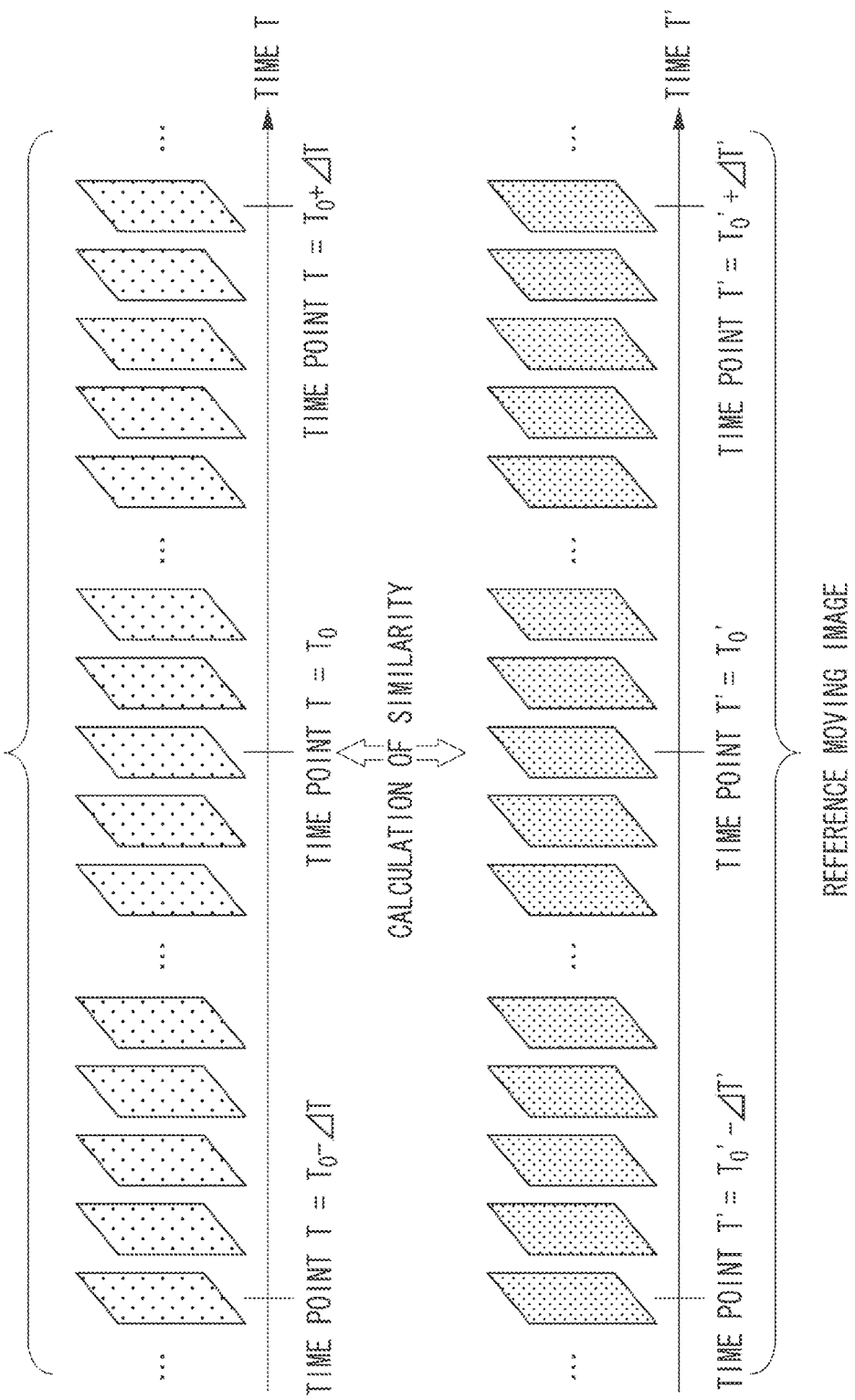

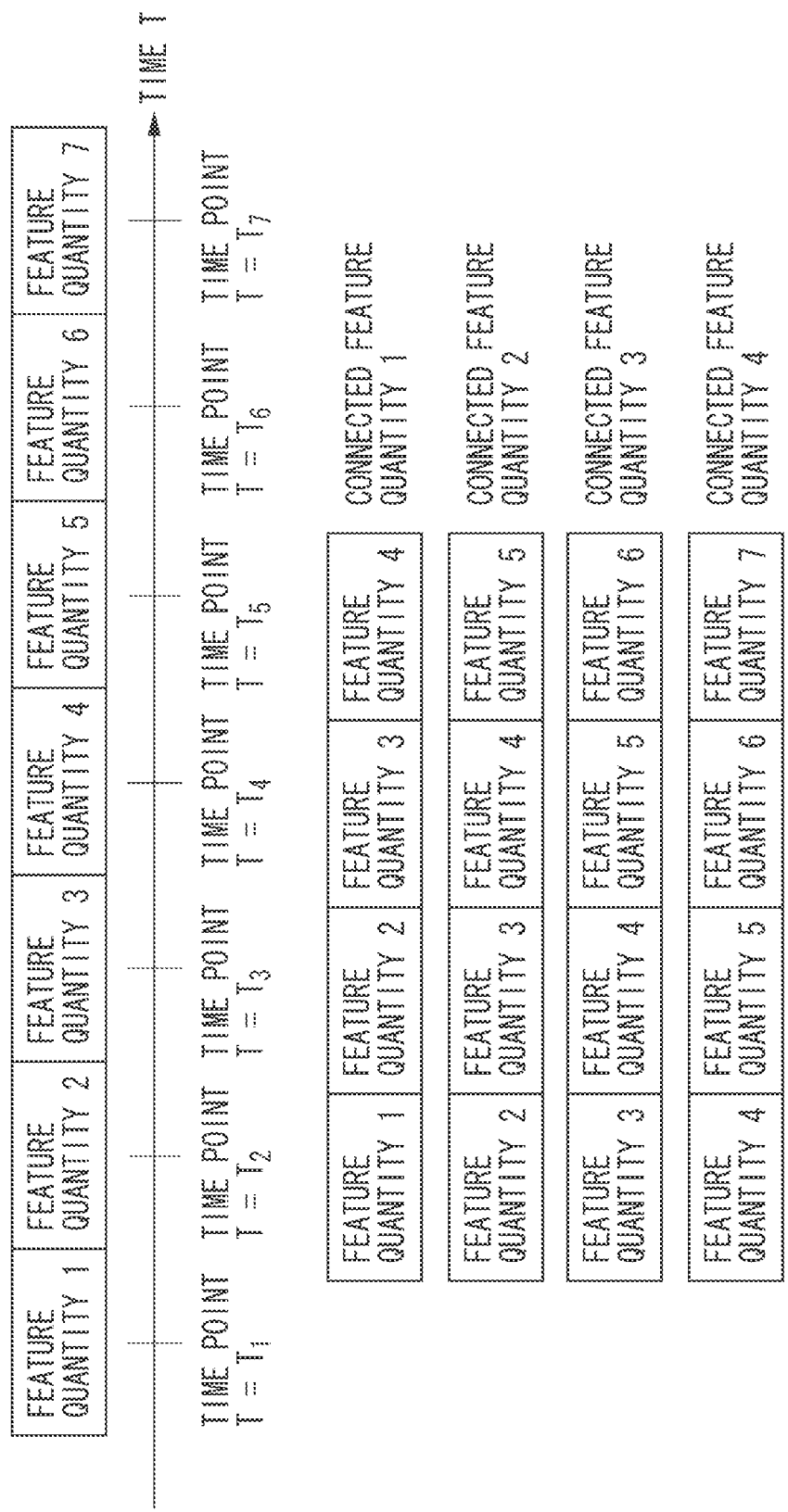

EVENT DETECTION APPARATUS AND EVENT DETECTION METHOD

BACKGROUND OF THE INVENTION

Field of the Invention

The present invention relates to event detection, and, in particular, to a technique for detecting an event from an image sequence.

Description of the Related Art

Examples of proposed methods for appropriately detecting an event in a moving image include methods discussed in Japanese Patent Application Laid-Open No. 2006-79272, and in "Detection of Abnormal Motion from a Scene Containing Multiple Person's Moves" written by Takuya Nanri and Nobuyuki Otsu, which is provided in Transactions of Information Processing Society of Japan, Computer Vision and Image Media, Vol. 45, No. SIG15, pages 43 to 50, published in 2005. According to the methods discussed in these literatures, Cubic Higher-Order Local Auto-Correlation (CHLAC) is extracted from a moving image, and an abnormal value is calculated by the subspace method, whereby an event is detected from the moving image.

However, the methods based on the subspace method discussed in the above-described literatures require a normal motion to be defined in advance and a large amount of moving image sequences to be prepared for this normal motion.

SUMMARY OF THE INVENTION

According to an aspect of the present invention, an event detection apparatus includes an input unit configured to input a plurality of time-sequential images, a first extraction unit configured to extract sets of first image samples according to respective different sample scales from a first time range of the plurality of time-sequential images based on a first scale parameter, a second extraction unit configured to extract sets of second image samples according to respective different sample scales from a second time range of the plurality of time-sequential images based on a second scale parameter, a dissimilarity calculation unit configured to calculate a dissimilarity between the first and second image samples based on the sets of the first and second image samples, and a detection unit configured to detect an event from the plurality of time-sequential images based on the dissimilarity.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10A illustrates examples of image samples, and

FIG. 10B illustrates examples of reference image samples.

FIG. 16 illustrates examples of moving images used in action recognition.

FIG. 17 illustrates calculation of feature quantities.

DESCRIPTION OF THE EMBODIMENTS

Various exemplary embodiments, features, and aspects of the invention will be described in detail below with reference to the drawings.

Figure 1:
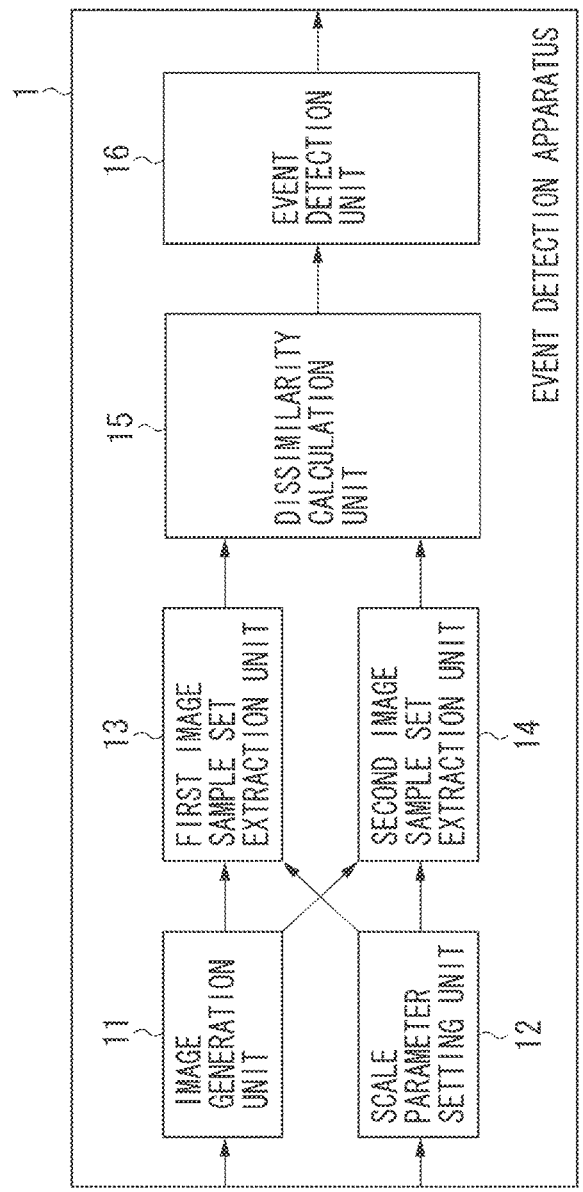
FIG. 1 is a block diagram illustrating a functional configuration of an event detection apparatus according to a first exemplary embodiment of the present invention.

FIG. 1 is a block diagram illustrating a functional configuration of an event detection apparatus 1 according to a first exemplary embodiment of the present invention. The event detection apparatus 1 according to the present exemplary embodiment is realized by using a semiconductor large-scale integration (LSI) circuit. As illustrated in FIG. 1, the event detection apparatus 1 includes an image generation unit 11, a scale parameter setting unit 12, a first image sample set extraction unit 13, a second image sample set extraction unit 14, a dissimilarity calculation unit 15, and an event detection unit 16. These constituent components correspond to respective functions fulfilled by the event detection apparatus 1.

Further, in the present exemplary embodiment, the term "event" is used to collectively refer to a motion pattern, a status pattern of a subject (a human or an object), or a change thereof. Examples of phenomena recognizable as an event include an action of a subject.

An even detection result acquired by the event detection apparatus 1 is transmitted to an upper layer (an application layer) of the event detection apparatus 1, and is used in various image processing applications for detection of an abnormal action, which is implemented on a security camera, and for video segmentation, which is implemented on, for example, a Digital Versatile Disc (DVD) recorder and a video camera for family use.

Figure 2:
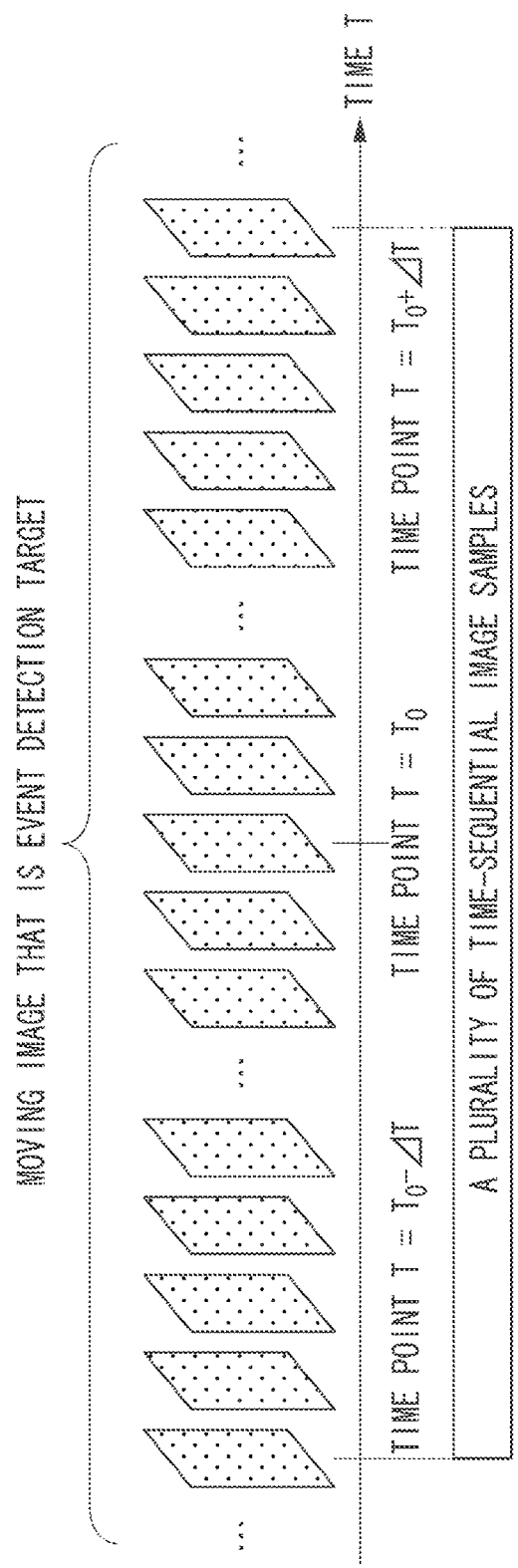
FIG. 2 illustrates examples of image samples.

FIG. 2 illustrates examples of image samples. As illustrated in FIG. 2, by designating an image sample generated at a predetermined time point $T_0$ in a moving image that is an event detection target (hereinafter referred to as a "key frame") as a base point, the image generation unit 11 outputs image samples generated for a predetermined time period $\Delta T$ before the key frame, to the first image sample set extraction unit 13. Similarly, the image generation unit 11 outputs image samples generated for the predetermined time period $\Delta T$ after the key frame, to the second image sample set extraction unit 14.

Figure 3:
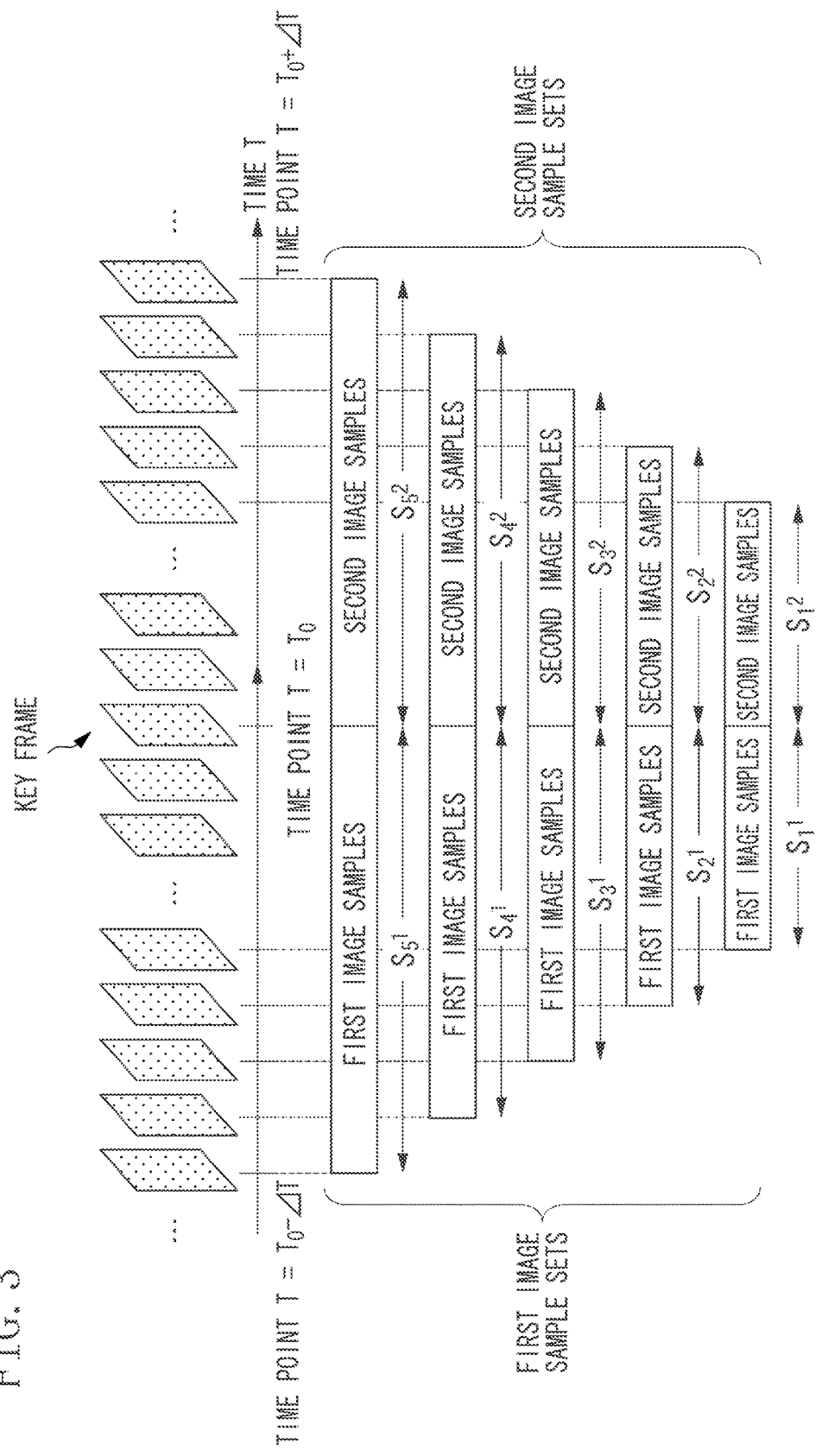
FIG. 3 illustrates examples of image sample sets.

FIG. 3 illustrates examples of image sample sets. As illustrated in FIG. 3, the scale parameter setting unit 12 sets first scale parameters and second scale parameters (N, $S_n^1$, $S_n^2$, $L_n^1$, and $L_n^2$) required to define sets of first image samples and sets of second image samples. More specifically, the scale parameter setting unit 12 sets the number N of sets (layers) of the first image samples and the second image samples (N is 5 in the example illustrated in FIG. 3), the respective numbers of samples ($S_n^1$, $S_n^2$) existing in the first image sample set and second image sample set corresponding to the n-th pair among the first image sample sets and the second image sample sets (n is 1 to 5 in the example illustrated in FIG. 3), and the respective sampling intervals ($L_n^1$, $L_n^2$) in the first image sample set and the second image sample set corresponding to the n-th pair among the first image sample sets and second image sample sets. Further, the scale parameter setting unit 12 may set the temporal range determined by, for example, the predetermined time point $T_0$ and the predetermined time period $\Delta T$ as a scale parameter.

It may be effective to set these parameters according to subsequent processing that will use the event detection result. For example, in a case where the event detection result is used in off-line processing such as video segmentation, it may be effective to set the number of layers N and the image sample numbers ($S_n^1$ and $S_n^2$) to relatively large values and set the sampling intervals ($L_n^1$ and $L_n^2$) to relatively small values. On the other hand, in a case where the event detection result is used in on-line processing with, for example, a security camera, it may be effective to set the number of layers N and the image sample numbers ($S_n^1$ and $S_n^2$) to relatively small values and set the sampling intervals ($L_n^1$ and $L_n^2$) to relatively large values.

Figure 4:
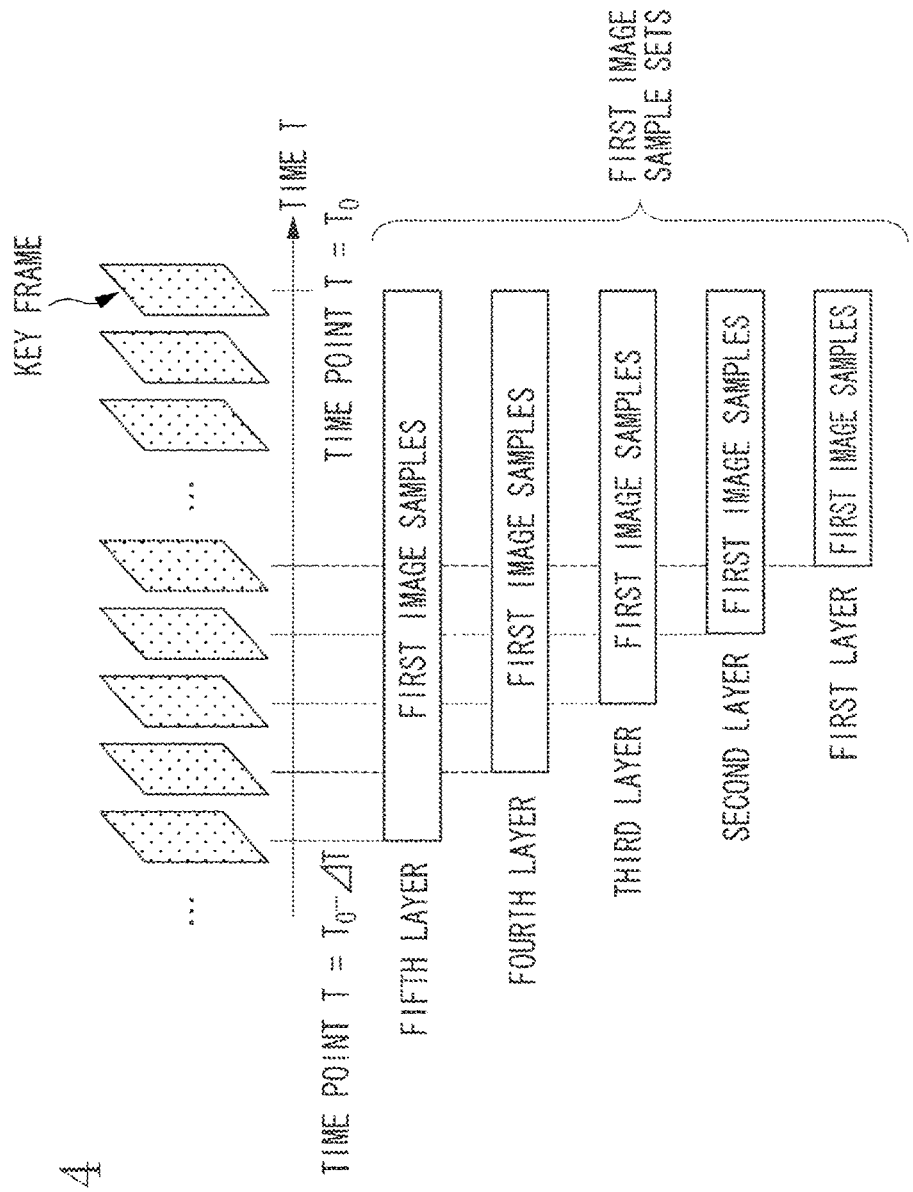
FIG. 4 illustrates examples of sets of first image samples.

FIG. 4 illustrates examples of the sets of the first image samples. As illustrated in FIG. 4, the first image sample set extraction unit 13 generates sets of image samples based on different time scales according to the parameters (N, $S_n^1$, and $L_n^1$) set by the scale parameter setting unit 12.

Figure 5:
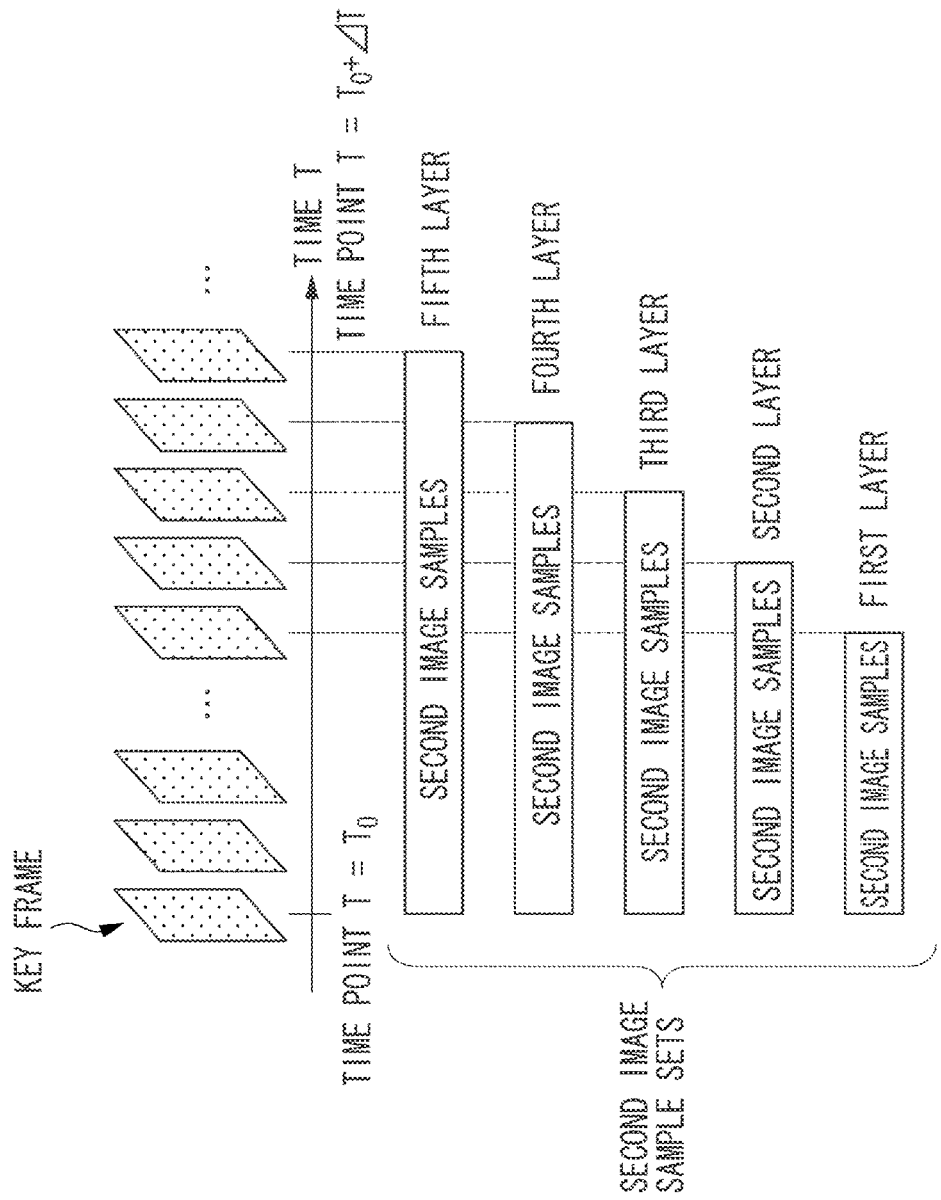
FIG. 5 illustrates examples of sets of second image samples.

Similarly, FIG. 5 illustrates examples of the sets of the second image samples. As illustrated in FIG. 5, the second image sample set extraction unit 14 generates sets of image samples based on different time scales according to the parameters (N, $S_n^2$, and $L_n^2$) set by the scale parameter setting unit 12.

Figure 6:
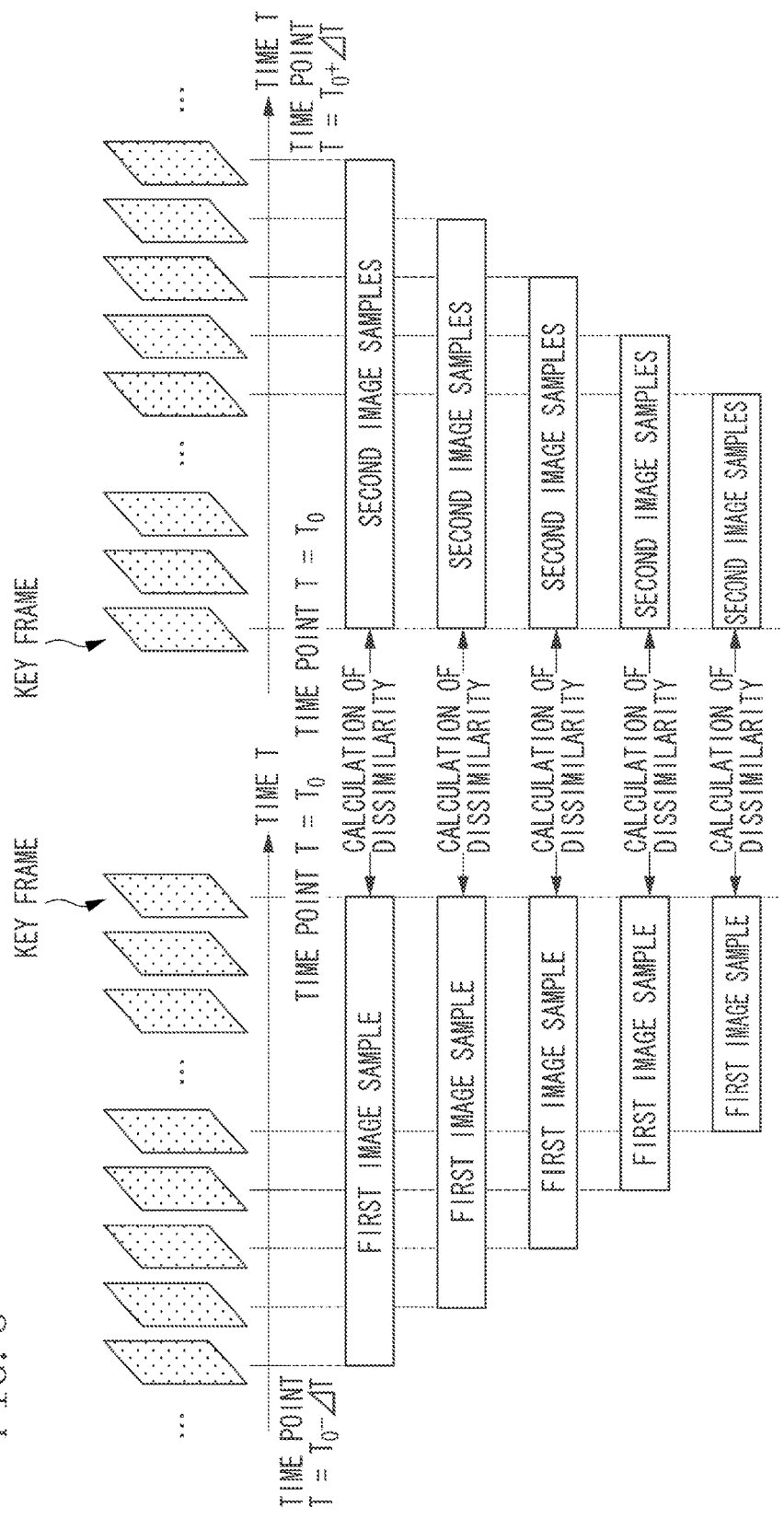
FIG. 6 illustrates processing for calculating dissimilarities.

FIG. 6 illustrates processing for calculating dissimilarities. As illustrated in FIG. 6, the dissimilarity calculation unit 15 calculates a dissimilarity D between the first image samples acquired by the first image sample set extraction unit 13 and the second image samples acquired by the second image sample set extraction unit 14, for each layer.

More specifically, the dissimilarity calculation unit 15 calculates the dissimilarity D based on a ratio (R=p1/p2) between a probability density p1 of a predetermined feature quantity calculated from the first image samples, and a probability density p2 of a predetermined feature quantity calculated from the second image samples.

The predetermined feature quantities calculated from the respective sets of the first and second image samples can be calculated by using, for example, Cubic Higher-Order Local Auto-Correlation (CHLAC) discussed in "Action and Simultaneous Multiple-Person Identification Using Cubic Higher-Order Local Auto-Correlation" presented by T. Kobayashi and N. Otsu at International Conference on Pattern Recognition held in 2004. Alternatively, the predetermined feature quantities calculated from the respective sets of the first and second image samples may be calculated by using Histograms of Oriented Gradients (HOG) discussed in "Histograms of Oriented Gradients for Human Detection" written by N. Dalal and B. Triggs, which is provided in Proceedings of Institute of Electrical and Electronics Engineers (IEEE) Conference on Computer Vision and Pattern Recognition (CVPR), pages 886 to 893, published in 2005, or using Scale Invariant Feature Transform (SIFT) discussed in "Distinctive Image Features from Scale-Invariant Keypoints" written by David G. Lowe, which is provided in Journal of Computer Vision, 60, 2, pages 91 to 110, published in 2004. Further alternatively, the predetermined feature quantities calculated from the respective sets of the first and second image samples may be calculated by acquiring the velocity field (the speed of the object+the speed of the camera) of the image and by using an optical flow in which the velocity field is expressed as a vector set. Further alternatively, the feature quantities described above as examples may be combined and used.

Further, the dissimilarity D can be calculated by using a dispersion, which is a basic statistic of the density ratio (R=p1/p2). Alternatively, the dissimilarity D may be calculated by using a kurtosis or a skewness, which are basic statistics of the density ratio (R=p1/p2). Further alternatively, the dissimilarity D may be calculated by using an absolute difference value between a mean value of the density ratio of the first image samples and a mean value of the density ratio of the second image samples.

The density ratio (R=p1/p2) between the probability density p1 of the predetermined feature quantity calculated from the first image samples and the probability density p2 of the predetermined feature quantity calculated from the second image samples can be calculated by using, for example, the density ratio estimation method discussed in "A Least-Squares Approach to Direct Importance Estimation" written by T. Kanamori, S. Hido, and M. Sugiyama, which is provided in Journal of Machine Learning Research, Volume 10, pages 1391 to 1445, published in July, 2009.

More specifically, first, a feature quantity is calculated from a sample as training data. Similarly, a feature quantity is calculated from another sample than the training data as test data. At this time, the ratio between the probability density of the feature quantity of the training data and the probability density of the feature quantity of the test data can be calculated by estimating the probability density of the feature quantity of the training data and the probability density of the feature quantity of the test data. However, it is known to be extremely difficult to estimate a correct probability density from a finite number of samples, and a direct estimation of a probability density should be avoided.

Therefore, model parameters for estimating the ratio between the probability density of the training data and the probability density of the test data are determined by the cross validation method, thereby directly estimating the ratio between the probability density of the training data and the probability density of the test data without estimating the respective probability densities of the training data and the test data.

The event detection unit 16 detects an event based on a dissimilarity $D_n$ (n=0 to N) for the n-th layer among the first image sample sets and the second image sample sets, which is calculated by the dissimilarity calculation unit 15. The number N here indicates the number of pairs N of the first image samples and the second image samples, which is set by the scale parameter setting unit 12 (N=5 in the example illustrated in FIG. 3).

More specifically, a likelihood L, which indicates whether an event may occur at the time point T corresponding to the key frame for which the dissimilarity $D_n$ (n=0 to 5) is acquired, is calculated by using, for example, equation (1). If the likelihood L is higher than a predetermined threshold value Th, the event detection unit 16 determines that an event occurs at the time point T. The predetermined threshold value Th is set in advance in the upper layer (the application layer) of the event detection apparatus 1 according to the characteristics of the moving image that is an event detection target.

$$L = \sum_{n=0}^{N} Dn \quad (1)$$

Alternatively, the likelihood L may be provided as a product of the dissimilarities $D_n$ (n=0 to N), as expressed by equation (2).

$$L = \prod_{n=0}^{N} Dn \quad (2)$$

Further alternatively, the likelihood L may be provided as a sum of products of the dissimilarities $D_n$ (n=0 to N) and weights $W_n$ (n=0 to N) prepared in advance, as expressed by equation (3).

$$L = \sum_{n=0}^{N} Wn \cdot Dn \quad (3)$$

Further alternatively, the event detection unit 16 may calculate the likelihood L for each of a plurality of time points or frames according to any of the above-described equations (1) to (3), and determine that an event occurs at the time point or frame having a maximum likelihood L.

The event detection result acquired in this way is transmitted to the upper layer of the event detection apparatus 1. For example, in a use case where a DVD recorder or a video camera for family use detects an event in a moving image, compares the detected event with a database prepared in advance, and thereby assigns an event name to the event, the event detection result is transmitted to, for example, a central processing unit (CPU) or a program that controls the event detection apparatus 1.

Figure 7:
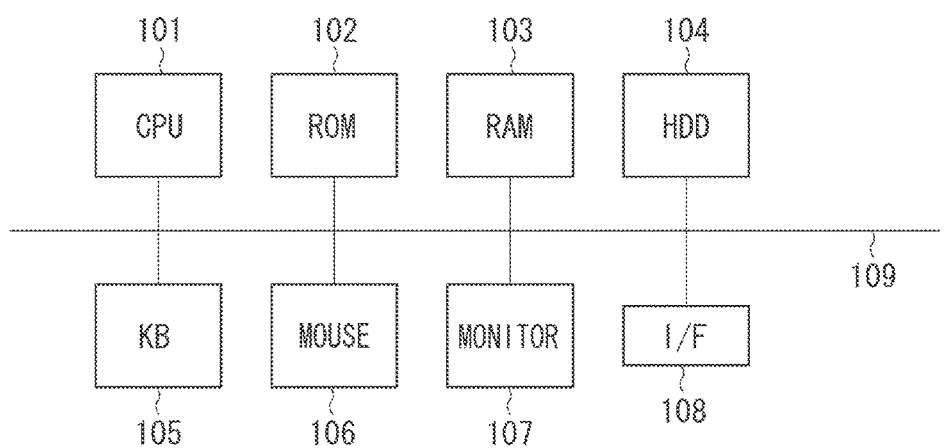
FIG. 7 illustrates an example of a hardware configuration of the event detection apparatus according to the first exemplary embodiment.

The event detection apparatus 1 according to the present exemplary embodiment may be realized by means of software. FIG. 7 illustrates an example of a hardware configuration when the event detection apparatus 1 according to the present exemplary embodiment is realized by means of software. The event detection apparatus 1 includes a CPU 101, a read only memory (ROM) 102, a random access memory (RAM) 103, a hard disk drive (HDD) 104, a keyboard (KB) 105, a mouse 106, a monitor 107, and a network interface (I/F) 108. They are connected and configured so as to be able to communicate with one another via a bus 109.

The CPU 101 is in charge of operation control of the entire event detection apparatus 1. The CPU 101 executes a program stored in the ROM 102, and reads out various kinds of processing programs (software) from, for example, the HDD 104 to RAM 103 to execute them. The ROM 102 stores, for example, programs and various kinds of data used in the programs. The RAM 103 is used as, for example, a working area for temporarily storing, for example, a processing program, image samples to be processed, and scale parameters for various kinds of processing of the CPU 101.

The HDD 104 is a constituent component as an example of amass-storage device, and stores, for example, various kinds of data such as an input image, image samples, and scale parameters, or a processing program to be transferred to, for example, the RAM 1203 during execution of various kinds of processing.

The keyboard 105 and the mouse 106 are used when a user inputs, for example, various kinds of instructions to the event detection apparatus 1. The monitor 107 displays various kinds of information such as an instruction to the user and an analysis result. The interface 108 is used to introduce information from a network or another apparatus, and transmit information to the network or the apparatus.

Figure 8:
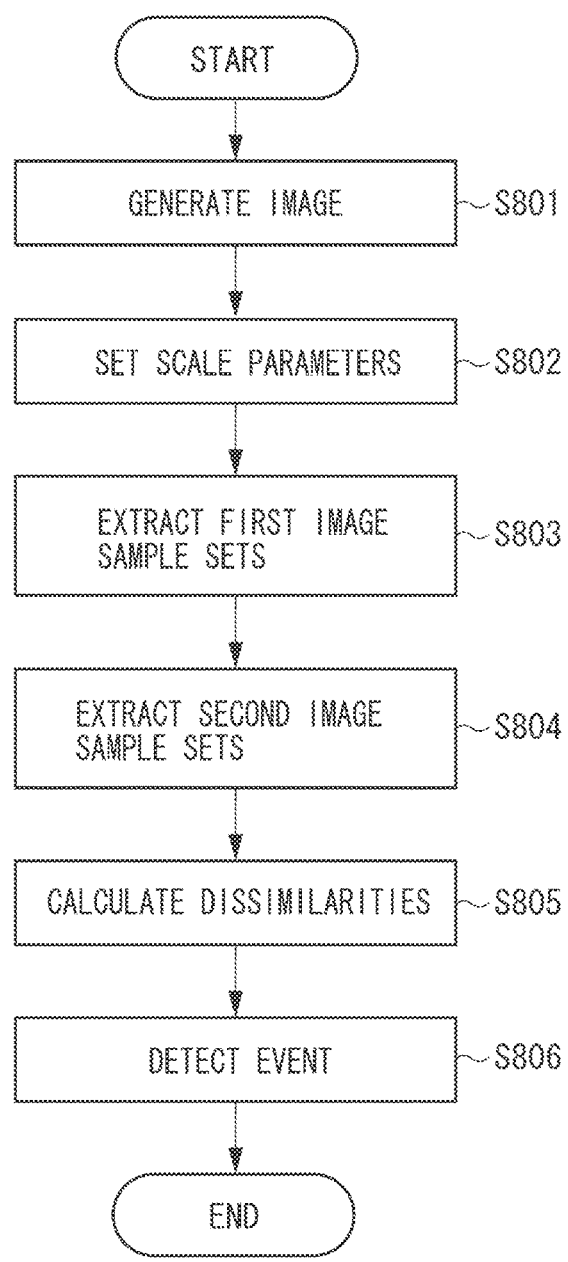
FIG. 8 is a flowchart illustrating a procedure of event detection processing according to the first exemplary embodiment.

FIG. 8 is a flowchart illustrating a procedure of event detection processing according to the present exemplary embodiment. As illustrated in FIG. 8, in the event detection apparatus 1, first, in step S801, the image generation unit 11 generates a moving image that is processed as an event detection target.

Next, in step S802, the scale parameter setting unit 12 sets the number of layers N, which is the number of sets of image samples, and the respective numbers of samples ($S_n^1$ and $S_n^2$) and the sampling intervals ($L_n^1$ and $L_n^2$) in the pair of the n-th first image sample set and the n-th second image sample set.

Then, in step S803, the first image sample set extraction unit 13 extracts the sets of the first image samples. In step S804, the second image sample set extraction unit 14 extracts the sets of the second image samples. Further, in step S805, the dissimilarity calculation unit 15 calculates the dissimilarity $D_n$ based on the ratio between the probability densities of the predetermined feature quantities of the first image samples and the second image samples, for each layer n.

Then, in step S806, the event detection unit 16 calculates the likelihood L regarding whether an event occurs based on the dissimilarity $D_n$ of each layer n, compares the likelihood L with the predetermined threshold value Th, and determines whether an event occurs at the key frame.

Figure 9:
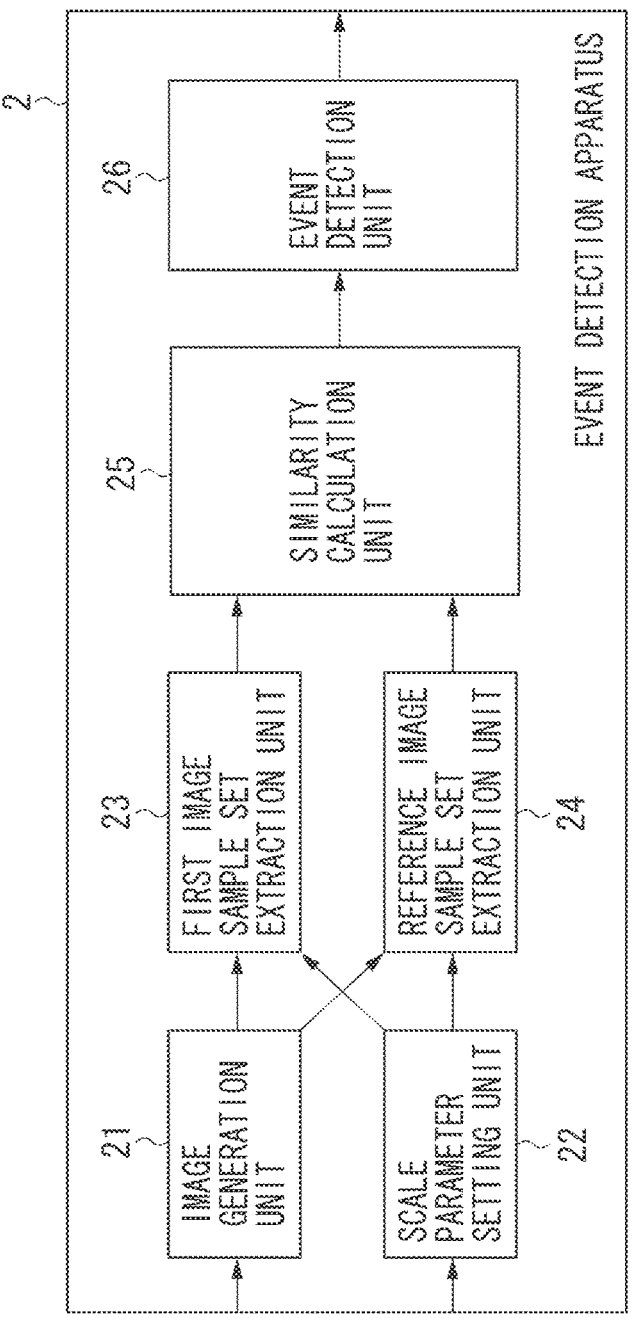
FIG. 9 is a block diagram illustrating a functional configuration of an event detection apparatus according to a second exemplary embodiment of the present invention.

A second exemplary embodiment of the present invention will be described with reference to FIGS. 9 to 13. FIG. 9 illustrates a functional configuration of an event detection apparatus according to the present exemplary embodiment. Many of the functions of the event detection apparatus 2 according to the present exemplary embodiment overlap the functions of the event detection apparatus 1 according to the first exemplary embodiment. Therefore, the second exemplary embodiment will be described, focusing on differences from the first exemplary embodiment.

In the present exemplary embodiment, the event detection apparatus 2 detects an event from a moving image that is an event detection target with use of a reference moving image prepared in advance. Time-sequential images of a specific action pattern or a specific event category may be provided as the reference moving image. Further, a set of video images containing only such a specific category may be provided as the reference moving image.

FIG. 10A illustrates examples of image samples. As illustrated in FIG. 10A, by designating an image sample generated at a predetermined time point $T_0$ in a moving image that is an event detection target as a base point, an image generation unit 21 outputs image samples generated for a predetermined time period ΔT after the base point, to a first image sample set extraction unit 23. The image sample at a time point $T=T_0+\Delta T/2$ is referred to as a "key frame" in the first image samples.

FIG. 10B illustrates examples of reference image samples. As illustrated in FIG. 10B, by designating an image sample generated at a predetermined time point $T'_0$ in a reference moving image prepared in advance as a base point, the image generation unit 21 outputs image samples generated for a predetermined time period ΔT' after the base point, to a reference image sample set extraction unit 24. The image sample at a time point $T'=T'_0+\Delta T'/2$ is referred to as a "key frame" in the reference image samples.

Figure 11:
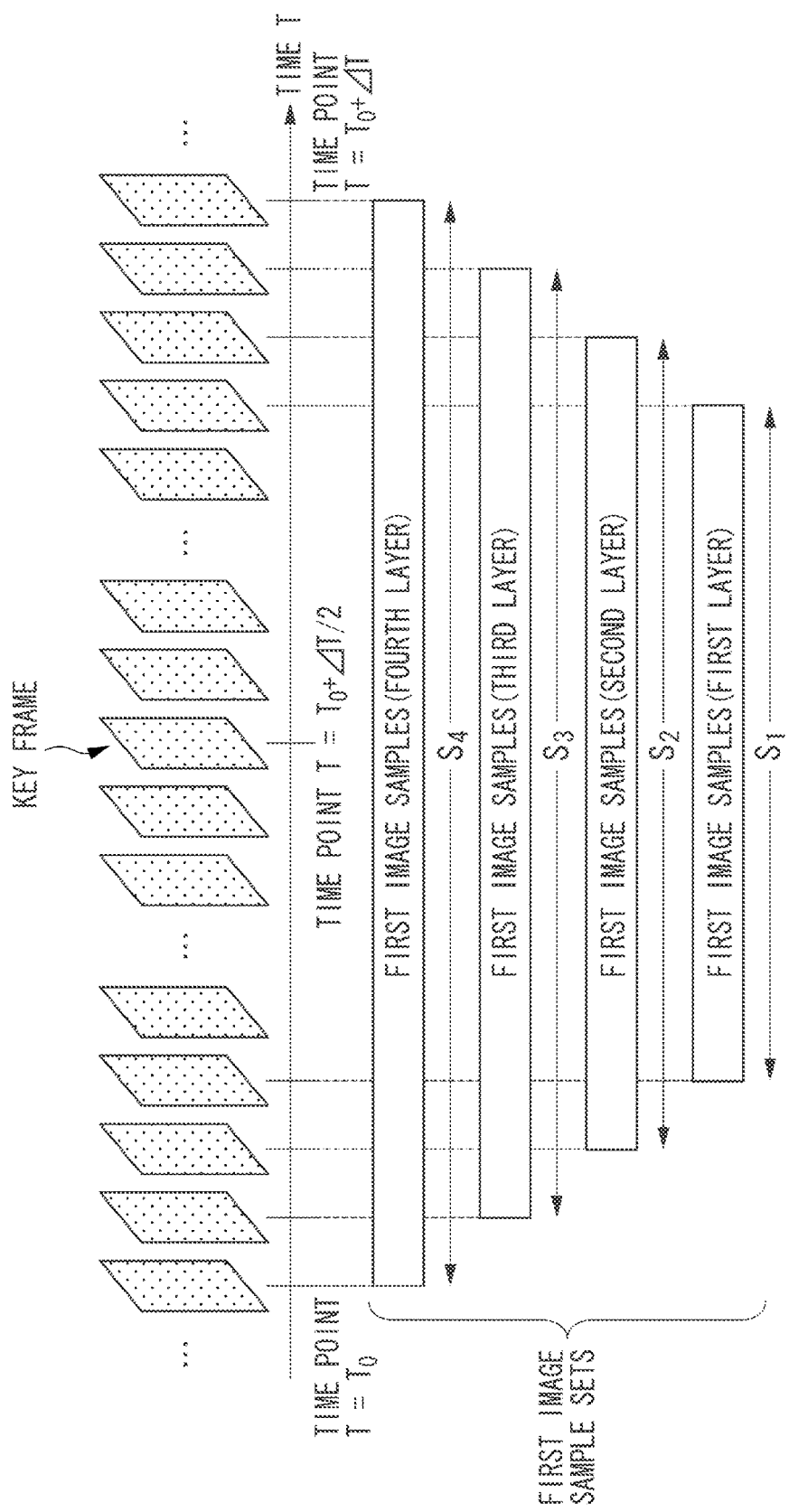
FIG. 11 illustrates examples of sets of the image samples.

FIG. 11 illustrates examples of sets of the image samples. As illustrated in FIG. 11, a scale parameter setting unit 22 sets parameters required to set the sets of the first image samples (N, $S_n$, and $L_n$). More specifically, the scale parameter setting unit 22 sets the number of layers N of the first image samples (N=4 in the example illustrated in FIG. 11), the number of samples $S_n$ existing in the first image samples at a predetermined layer n (n=1 to 4 in the example illustrated in FIG. 11), and the sampling interval $L_n$ of the first image samples at the predetermined layer n.

Figure 12:
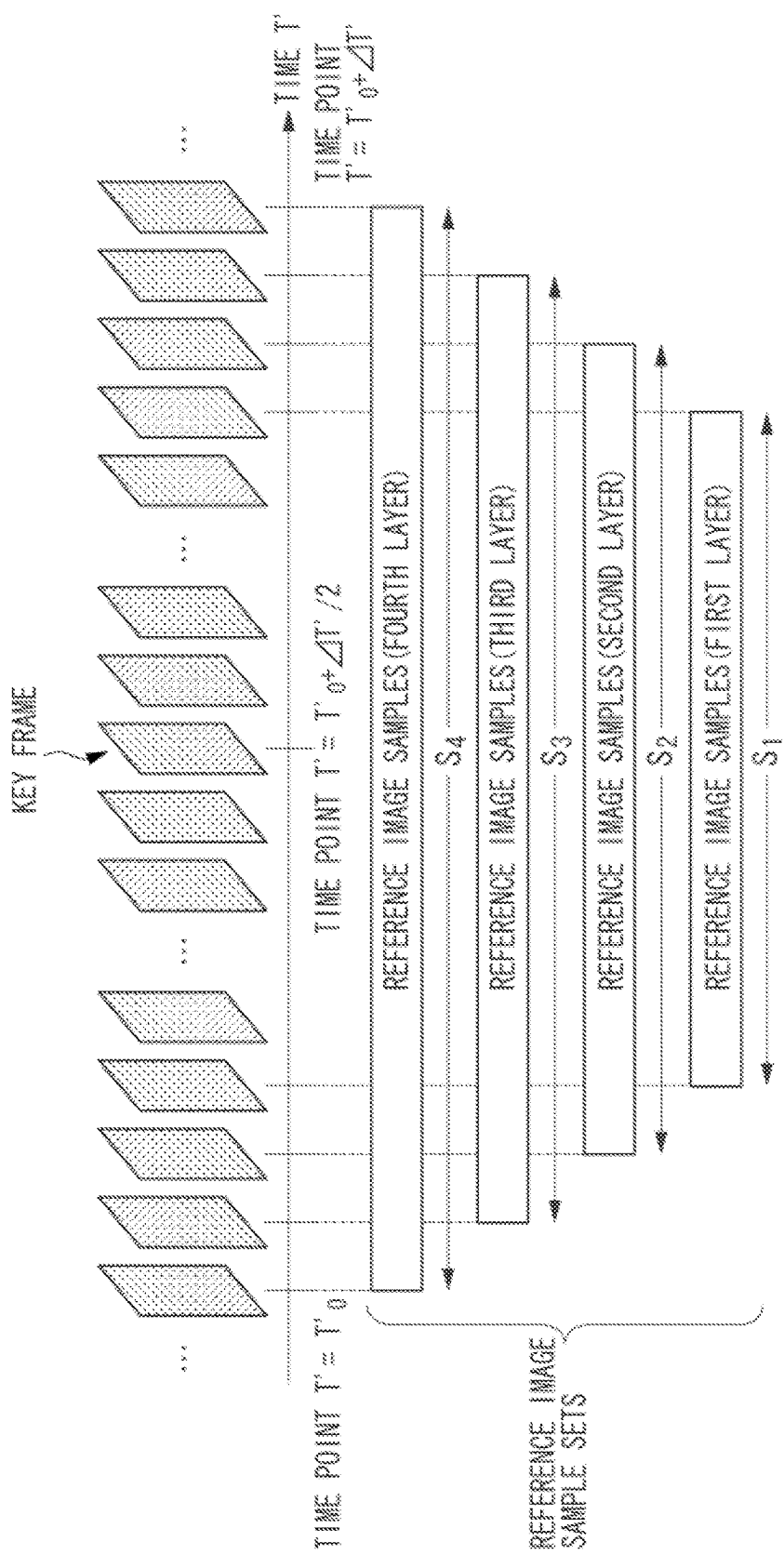
FIG. 12 illustrates examples of sets of the reference image samples.

FIG. 12 illustrates examples of sets of the reference image samples. As illustrated in FIG. 12, the scale parameter setting unit 22 sets parameters required to set the reference image sample sets (N', $S'_n$, and $L'_n$). More specifically, the scale parameter setting unit 22 sets the number of layers N' of the reference image samples (N'=4 in the example illustrated in FIG. 12), the number of samples $S'_n$ existing in the reference image samples at the predetermined layer n (n=1 to 4 in the example illustrated in FIG. 12), and the sampling interval $L'_n$ of the reference image samples at the predetermined layer n.

Regarding these parameters, if the event detection result is expected to be used in off-line processing such as video segmentation, it may be effective to set the number of layers (N and N') and the numbers of image samples ($S_n$ and $S'_n$) to relatively large values and set the sampling intervals ($L_n$ and $L'_n$) to relatively small values. On the other hand, if the event detection result is expected to be used in on-line processing with, for example, a security camera, it may be effective to set the number of layers (N and N') and the numbers of image samples ($S_n$ and $S'_n$) to relatively small values and set the sampling intervals ($L_n$ and $L'_n$) to relatively large values.

As illustrated in FIG. 11, the first image sample set extraction unit 23 generates image sample sets based on different time scales according to the parameters (N, $S_n$, and $L_n$) set by the scale parameter setting unit 22.

Similarly, as illustrated in FIG. 12, the reference image sample set extraction unit 24 generates image sample sets based on different time scales from the reference moving image prepared in advance according to the parameters (N', $S'_n$, and $L'_n$) set by the scale parameter setting unit 22.

Figure 13:
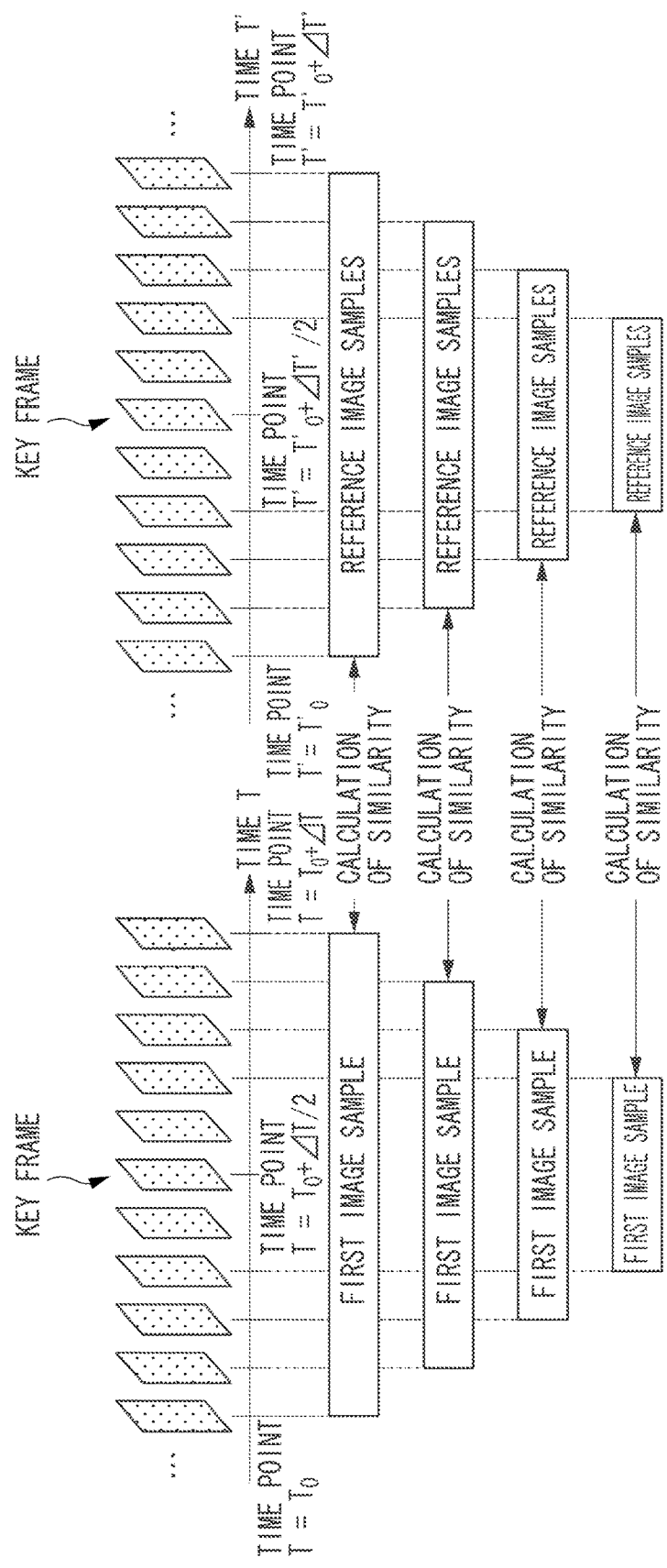
FIG. 13 illustrates calculation of similarities.

FIG. 13 illustrates calculation of similarities. As illustrated in FIG. 13, a similarity calculation unit 25 calculates a similarity S between the first image samples acquired by the first image sample set extraction unit 23 and the reference image samples acquired by the reference image sample set extraction unit 24. More specifically, the similarity calculation unit 25 calculates the similarity S based on a ratio (R=p1/p2) between a probability density p1 of a predetermined feature quantity calculated from the first image samples and a probability density p2 of a predetermined feature quantity calculated from the reference image samples.

For example, the similarity S can be calculated by using an inverse of a dispersion, an inverse of a kurtosis, or an inverse of a skewness, which are basic statistics of the density ratio (R=p1/p2). Alternatively, the similarity S may be calculated by using an inverse of an absolute difference value between a mean value of the density ratio of the first image samples and a mean value of the density ratio of the reference image samples.

The probability density ratio (R=p1/p2) between the probability density p1 of the predetermined feature quantity calculated from the first image samples and the probability density p2 of the predetermined feature quantity calculated from the reference image samples can be calculated by using the density ratio estimation method discussed in "Action and Simultaneous Multiple-Person Identification Using Cubic Higher-Order Local Auto-Correlation" presented by T. Kobayashi and N. Otsu at International Conference on Pattern Recognition held in 2004 or "Histograms of Oriented Gradients for Human Detection" written by N. Dalal and B. Triggs, which is provided in Proceedings of Institute of Electrical and Electronics Engineers (IEEE) Conference on Computer Vision and Pattern Recognition (CVPR), pages 886 to 893, published in 2005, in a similar manner to the first exemplary embodiment.

An event detection unit 26 detects an event based on the similarity Sn (n=0 to N) for the n-th layer among the first image sample sets and the second image sample sets, which is calculated by the similarity calculation unit 25. The number N here indicates the number of layers N of the first image samples and the reference image samples, which is set by the scale parameter setting unit 22 (N=5 in the example illustrated in FIG. 3).

More specifically, a likelihood L, which indicates whether an event of the time point T' corresponding to the key frame in the reference image samples prepared in advance may occur at the time point T corresponding to the key frame in the first image samples for which the similarity Sn (n=0 to N) is acquired, is calculated by using, for example, equation (4). If the likelihood L is higher than a threshold value Th, the event detection unit 26 determines that the event of the time point T' corresponding to the key frame in the reference image samples prepared in advance occurs at the time point T corresponding to the key frame in the first image samples.

The event of the time point T' corresponding to the key frame in the reference image samples can be named in advance, so that an event occurring at the time point T corresponding to the key frame in the first image samples can be specifically detected. The predetermined threshold value Th is set in advance in an upper layer of the event detection apparatus 2 according to the characteristics of the moving image that is an event detection target.

$$L = \sum_{n=0}^{N} Sn \qquad (4)$$

Alternatively, the likelihood L may be provided as a product of the similarities Sn (n=0 to N), as expressed by equation (5).

$$L = \prod_{n=0}^{N} Sn \qquad (5)$$

Further alternatively, the likelihood L may be provided as a sum of products of the similarities Sn (n=0 to N) and a weight $W_n$ (n=0 to N) prepared in advance, as expressed by equation (6).

$$L = \sum_{n=0}^{N} Wn \cdot DS \quad (6)$$

Further alternatively, the event detection unit 26 may determine that an event occurs at the time point or frame having a maximum likelihood L in the above-described equations (4) to (6).

The thus-acquired event detection result and event name are transmitted to, for example, a CPU or a program that controls the event detection apparatus 2, for example, in a case where the event detection result is expected to be used in video segmentation or video summarization in the upper layer (an application layer) of the event detection apparatus 2 such as a DVD recorder or a video camera for family use.

A third exemplary embodiment of the present invention will be described with reference to FIG. 14. The functional configuration of an event detection apparatus according to the present exemplary embodiment is as illustrated in FIG. 1, as is the case with the first exemplary embodiment. However, the details of some functions of the present exemplary embodiment are different from the first exemplary embodiment. Many of the functions of the event detection apparatus according to the present exemplary embodiment overlap the functions of the event detection apparatus 1 according to the first exemplary embodiment. Therefore, the third exemplary embodiment will be described, focusing on the differences from the first exemplary embodiment.

The event detection unit 16 detects an event based on the dissimilarity $D_n$ (n=0 to N) for the n-th layer among the first image sample sets and the second image sample sets, which is calculated by the dissimilarity calculation unit 15. The number N here indicates the number of layers N of the first image samples and the second image samples, which is set by the scale parameter setting unit 12 (N=4 in the example illustrated in FIG. 13).

Figure 14:
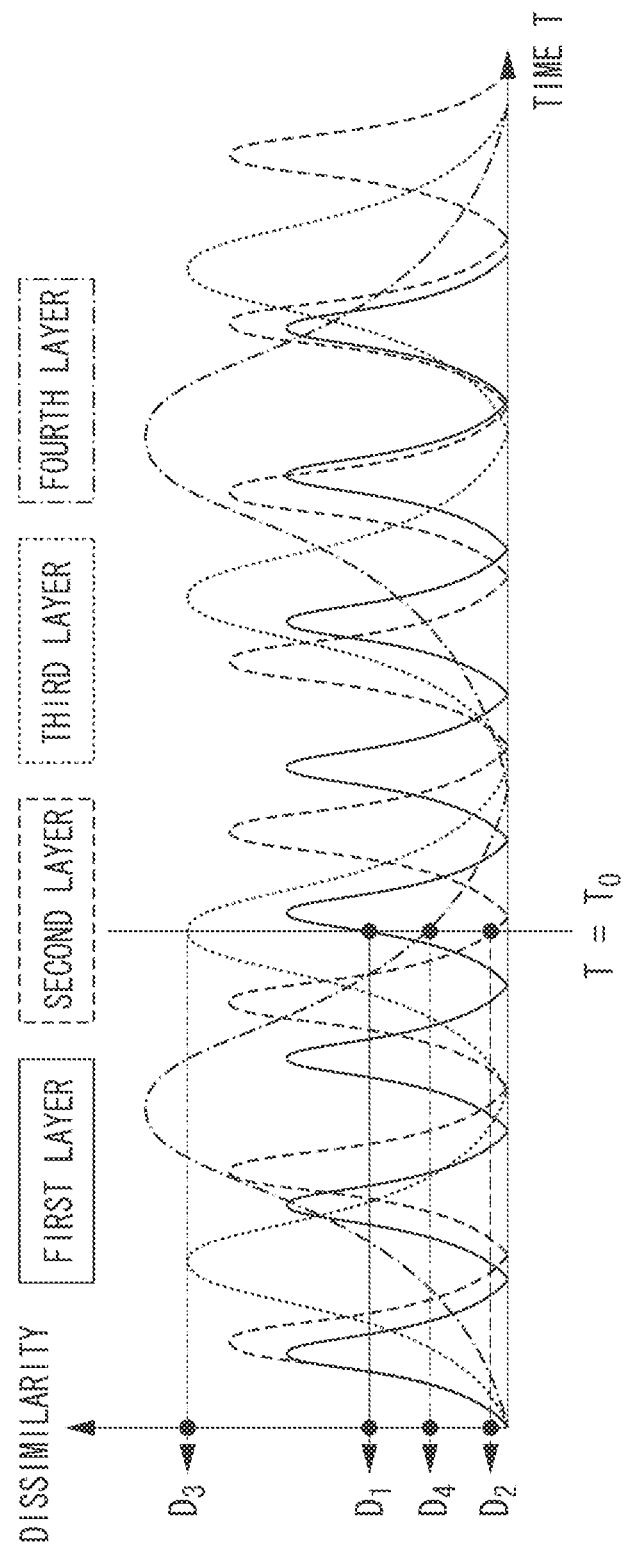
FIG. 14 illustrates calculation of a time-sequential pattern feature according to a third exemplary embodiment of the present invention.

FIG. 14 illustrates calculation of a time-sequential pattern feature. As illustrated in FIG. 14, the event detection unit 16 calculates a time-sequential pattern feature F(T) with use of a dissimilarity $D_n(T)$ (n=0 to N) calculated at the predetermined time point $T_0$. For example, if N=4, the time-sequential pattern feature F(T) is provided as F(T)=($D_1$, $D_2$, $D_3$, $D_4$). Further, a classifier D(F(T)) is generated by calculating a plurality of time-sequential pattern features F(T) from reference image samples prepared in advance.

The classifier D(F(T)) can be generated by, for example, using a known technique, Support Vector Machine (SVM) to which the time-sequential pattern feature F(T) is input. Alternatively, the classifier D(F(T)) may be generated by, for example, using a known technique, k-nearest neighbor algorithm (kNN) to which the time-sequential pattern feature F(T) is input. Further alternatively, the classifier D(F(T)) may be generated by using another machine leaning technique to which the time-sequential pattern feature F(T) is input.

Further, the event detection unit 16 inputs the time-sequential pattern feature F(T) calculated at the predetermined time point T to the classifier D(F(T)), and determines that a known event in the reference image samples prepared in advance occurs at the predetermined time point T if the classifier D(F(T)) outputs a positive actual value.

The thus-acquired event detection result and event name are transmitted to, for example, the CPU or program that controls the event detection apparatus 1, in a case where the event detection result is expected to be used to detect an event in a moving image, compare the detected event with a database prepared in advance, and thereby assign an event name to the event in the upper layer (the application layer) of the event detection apparatus 1 such as a DVD recorder or a video camera for family use.

Figure 15:
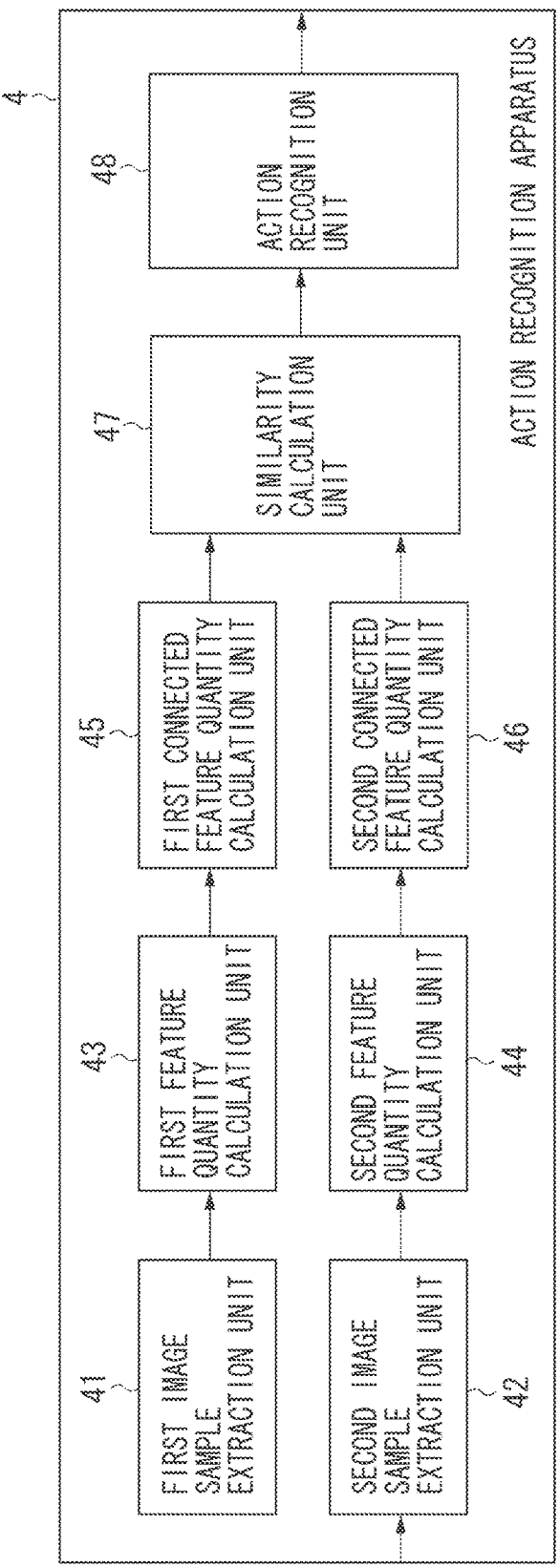
FIG. 15 is a block diagram illustrating a functional configuration of an action recognition apparatus according to a fourth exemplary embodiment of the present invention.

A fourth exemplary embodiment of the present invention will be described with reference to FIGS. 15 to 17. FIG. 15 is a block diagram schematically illustrating a configuration of an action recognition apparatus 4 according to the fourth exemplary embodiment. The action recognition apparatus 4 according to the present exemplary embodiment is realized with use of a semiconductor LSI circuit, but may be implemented as software. As illustrated in FIG. 15, the action recognition apparatus 4 includes a first image sample extraction unit 41, a second image sample extraction unit 42, a first feature quantity calculation unit 43, a second feature quantity calculation unit 44, a first connected feature quantity calculation unit 45, a second connected feature quantity calculation unit 46, a similarity calculation unit 47, and an action recognition unit 48. These constituent components correspond to respective functions fulfilled by the action recognition apparatus 4.

In the present exemplary embodiment, a time-sequential image indicating a specific action pattern or a specific event category may be provided as a reference image. Further, a set of video images containing only such a specific category may be provided as a reference image.

FIG. 16 illustrates examples of moving images used in action recognition. The action recognition apparatus 4 recognizes an action in a moving image that is an action recognition target based on a reference moving image. As illustrated in FIG. 16, by designating an image sample generated at a predetermined time point $T'_0$ in the reference moving image prepared in advance as a base point, the first image sample extraction unit 41 extracts image samples generated for a time period ΔT' before the base point and image samples generated for the time period ΔT' after the base point, and outputs the extracted image samples to the first feature quantity calculation unit 43.

Further, as illustrated in FIG. 16, by designating an image sample generated at a predetermined time point $T_0$ from the moving image that is a action recognition target as a base point, the second image sample extraction unit 42 extracts image samples generated for a time period ΔT before the base point and image samples generated for the time period ΔT after the base point, and outputs the extracted samples to the second feature quantity calculation unit 44.

The first feature quantity calculation unit 43 extracts feature quantities from a group of the reference image samples extracted by the first image sample extraction unit 41, and outputs the extracted feature quantities to the first connected feature quantity calculation unit 45. Similarly, the second feature quantity calculation unit 44 extracts feature quantities from a group of the image samples as an action recognition target, which is extracted by the second image sample extraction unit 42, and outputs the extracted feature quantities to the second connected feature quantity calculation unit 46. The above-described feature quantities (a feature quantity 1, a feature quantity 2, a feature quantity 3, . . . ) may be extracted in any of various manners as to how to temporally divide the feature quantities to extract them, how many frames each feature quantity corresponds to, and how large each feature quantity is as an extraction unit (the number of frames).

The above-described feature quantities may be calculated by using, for example, the CHLAC, HOG, SIFT, or MBH feature quantity, or a combination thereof, or may be calculated by using an optical flow in which the velocity field of the image is expressed as a vector set, in a similar manner to the first exemplary embodiment.

FIG. 17 illustrates calculation of feature quantities. As illustrated in FIG. 17, the first connected feature quantity calculation unit 45 receives an input of the feature quantities calculated by the first feature quantity calculation unit 43, and outputs a plurality of connected feature quantities, which is generated by connecting k consecutive features, a feature i, a feature (i+1) . . . and a feature (i+(k−1)) in such a manner that the connected feature quantities partially overlap each other while maintaining the temporal order, to the similarity calculation unit 47.

Similarly, the second connected feature quantity calculation unit 46 receives an input of the feature quantities calculated by the second feature quantity calculation unit 44, and outputs a plurality of connected feature quantities, which is generated by connecting a predetermined number of feature quantities without changing the temporal order thereof while generating redundancy, to the similarity calculation unit 47. The number of connections is appropriately determined in advance in consideration of the classification performance and the processing time.

As illustrated in FIG. 16, the similarity calculation unit 47 receives inputs of the first connected feature quantity calculated by the first connected feature quantity calculation unit 45 and the second connected feature quantity calculated by the second connected feature quantity calculation unit 46, and calculates a similarity S between the group of the first image samples extracted by the first image sample set extraction unit 41, and the group of the second image samples extracted by the second image sample set extraction unit 42.

More specifically, the similarity calculation unit 47 calculates the similarity S based on a ratio (R=p1/p2) between a probability density p1 of the first connected feature quantity and a probability density p2 of the second connected feature quantity. Specifically, for example, the similarity S can be calculated by using an estimated value of the ratio R. Alternatively, the similarity S can be calculated by using an inverse of a dispersion, which is a basic statistic of the density ratio (R=p1/p2). Further alternatively, the similarity S may be calculated by using an inverse of a kurtosis, which is a basic statistic of the density ratio (R=p1/p2). Further alternatively, the similarity S may be calculated by using an inverse of a skewness, which is a basic statistic of the density ratio (R=p1/p2).

The probability density ratio (R=p1/p2) between the probability density p1 of the first connected feature quantity and the probability density p2 of the second connected feature quantity can be calculated by using a density ratio estimation method discussed in "Relative Density-Ratio Estimation for Robust Distribution Comparison" written by M. Yamada, T. Suzuki, T. Kanamori, H. Hachiya, and M. Sugiyama, which is provided in Advances in Neural Information Processing Systems 24, pages 594 to 602, 2011, edited by J. Shawe-Taylor, R. S. Zemel, P. Bartlett, F. C. N. Pereira, and K. Q. Weinberger, and presented at Neural Information Processing Systems (NIPS2011), Granada, Spain, Dec. 13 to 15, 2011.

The action recognition unit 48 determines whether the group of the first image samples and the group of the second image samples belong to a same action category based on the similarity S between the group of the first image samples and the group of the second image samples, which is calculated by the similarity calculation unit 47. More specifically, if the above-described similarity S is smaller than a predetermined threshold value Th, the action recognition unit 48 determines that an action belonging to the same category as the time point $T'_0$ of the first image sample group illustrated in FIG. 16 occurs at the time point $T_0$ of the second image sample group illustrated in FIG. 16.

Since an event name can be assigned to the event at the time point $T'_0$ of the first image sample group in advance, an action actually performed at the time point $T_0$ of the second image sample group can be detected. Further, the predetermined threshold value Th is set in advance in an upper layer of the action recognition apparatus 4 according to the characteristics of the moving image that is an action recognition target.

The thus-acquired action recognition result is transmitted to, for example, a CPU or a program that controls the action recognition apparatus 4, in a case where the action recognition result is expected to be used in video segmentation or video summarization in the upper layer (an application layer) of the action recognition apparatus 4 such as a DVD recorder or a video camera for family use.

Having described exemplary embodiments of the present invention, the present invention can be embodied as, for example, a system, an apparatus, a method, a computer readable program or a storage medium. More specifically, the present invention may be employed to a system constituted by a plurality of devices or an apparatus constituted by one single device.

Further, the present invention can include an example in which a software program is directly or remotely supplied to a system or an apparatus, and a computer of the system or the apparatus reads and executes the supplied program codes, by which the functions of the above-described exemplary embodiments are realized. In this case, the supplied program is a computer program corresponding to the flowcharts illustrated in the figures for the exemplary embodiments.

Further, besides the example in which the computer executes the read program to realize the functions of the above-described exemplary embodiments, the functions of the exemplary embodiments may be realized in cooperation with an operating system (OS) or the like that works on the computer based on instructions of the program. In this case, the OS or the like performs a part or all of actual processing, and the functions of the above-described exemplary embodiments are realized by that processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-246705 filed Nov. 10, 2011, which is hereby incorporated by reference herein in its entirety.

What is claimed is:

1. An event detection apparatus comprising:
   at least one processor and memory coupled to each other and cooperating to act as:
   an input unit configured to input a plurality of time-sequential images;
   a first extraction unit configured to extract sets of first image samples, the sets of first image samples composed of a plurality of layers, wherein each layer from the plurality of layers corresponds to a different sampling interval from a first time range of the plurality of time-sequential images, wherein each set of first image samples is composed of a plurality of image samples;

a second extraction unit configured to extract sets of second image samples, the sets of second image samples composed of a plurality of layers, wherein each layer from the plurality of layers corresponds to a different sampling interval from a second time range of the plurality of time-sequential images, wherein each set of second image samples is composed of a plurality of image samples;

a dissimilarity calculation unit configured to calculate a dissimilarity between a set of the first image samples and a set of the second image samples that have the same sampling interval, for each layer from the plurality of layers; and a detection unit configured to detect an event from the plurality of time-sequential images based on the calculated dissimilarity for each layer from the plurality of layers.

2. The event detection apparatus according to claim 1, wherein the first extraction unit is configured to extract the sets of the first image samples from images generated before a predetermined image among the plurality of time-sequential images, and wherein the second extraction unit is configured to extract the sets of the second image samples from images generated after the predetermined image among the plurality of time-sequential images.

3. The event detection apparatus according to claim 1, wherein the sets of first image samples are different from one another in a time range, and wherein the sets of second image samples are different from one another in a time range.

4. The event detection apparatus according to claim 1, wherein the sets of first image samples are different from one another in the number of the first image samples, and wherein the sets of second image samples are different from one another in the number of the second image samples.

5. The event detection apparatus according to claim 1, wherein the sets of first image samples are different from each other with respect to the quantity of image samples contained within each set from the sets of first image samples, and wherein the sets of second image samples are different from each other with respect to the quantity of image samples contained within each set from the sets of second image samples.

6. The event detection apparatus according to claim 1, wherein the detection unit is configured to detect an event, based on a plurality of dissimilarity patterns acquired from a predetermined reference image, from a pattern of the dissimilarity between respective corresponding first and second image samples in the sets of the first and second image samples.

7. The event detection apparatus according to claim 1, wherein the detection unit includes a likelihood calculation unit configured to calculate a likelihood of occurrence of the event in a specific image among the plurality of time-sequential images based on all of the calculated dissimilarities, and a determination unit configured to determine whether the event occurs in the specific image based on the likelihood.

8. The event detection apparatus according to claim 7, wherein the determination unit is configured to determine that the event occurs in the specific image if the likelihood is higher than a predetermined threshold value.

9. The event detection apparatus according to claim 7, wherein the likelihood calculation unit is configured to calculate the likelihood for a plurality of specific images, and wherein the determination unit is configured to determine that the event occurs in the specific image having a maximum likelihood.

10. An event detection method comprising:
inputting a plurality of time-sequential images;
extracting sets of first image samples, the sets of first image samples composed of a plurality of layers, wherein each layer from the plurality of layers corresponds to a different sampling interval from a first time range of the plurality of time-sequential images, wherein each set of first image samples is composed of a plurality of image samples;
extracting sets of second image samples, the sets of second image samples composed of a plurality of layers, wherein each layer from the plurality of layers corresponds to a different sampling interval from a second time range of the plurality of time-sequential images, wherein each set of second image samples is composed of a plurality of image samples;
calculating a dissimilarity between a set of the first image samples and a set of the second image samples that have the same sampling interval, for each layer from the plurality of layers;
detecting an event from the plurality of time-sequential images based on the calculated dissimilarity for each layer from the plurality of layers.

11. A non-transitory computer-readable storage medium storing a program that causes a computer to execute the event detection method according to claim 10.

* * * * *